United States Patent [19]
Dickerson

[11] Patent Number: 5,950,570
[45] Date of Patent: Sep. 14, 1999

[54] WEIGHT AND PULLING MUZZLED HARNESS

[76] Inventor: Lateif Graham Dickerson, 481 Jersey Ave., #2, Jersey City, N.J. 07302

[21] Appl. No.: 08/971,712

[22] Filed: Nov. 17, 1997

[51] Int. Cl.[6] .................................................. A01K 15/00
[52] U.S. Cl. .............................................................. 119/792
[58] Field of Search ...................... 179/792, 795, 179/831, 905, 907, 174

[56] References Cited

U.S. PATENT DOCUMENTS

| | | | |
|---|---|---|---|
| 5,038,717 | 8/1991 | Bent | 119/792 |
| 5,267,529 | 12/1993 | Zellinger | 119/831 |
| 5,511,515 | 4/1996 | Brown et al. | 119/792 X |
| 5,611,298 | 3/1997 | Sporn | 119/792 |
| 5,682,840 | 11/1997 | Mcfarland | 119/792 X |

*Primary Examiner*—Thomas Price
*Attorney, Agent, or Firm*—Arthur Jacob

[57] ABSTRACT

A weight bearing and weight pulling muzzled harnessing apparatus with an easily shortened lead for training and conditioning animals and preventing unwanted biting.

20 Claims, 4 Drawing Sheets

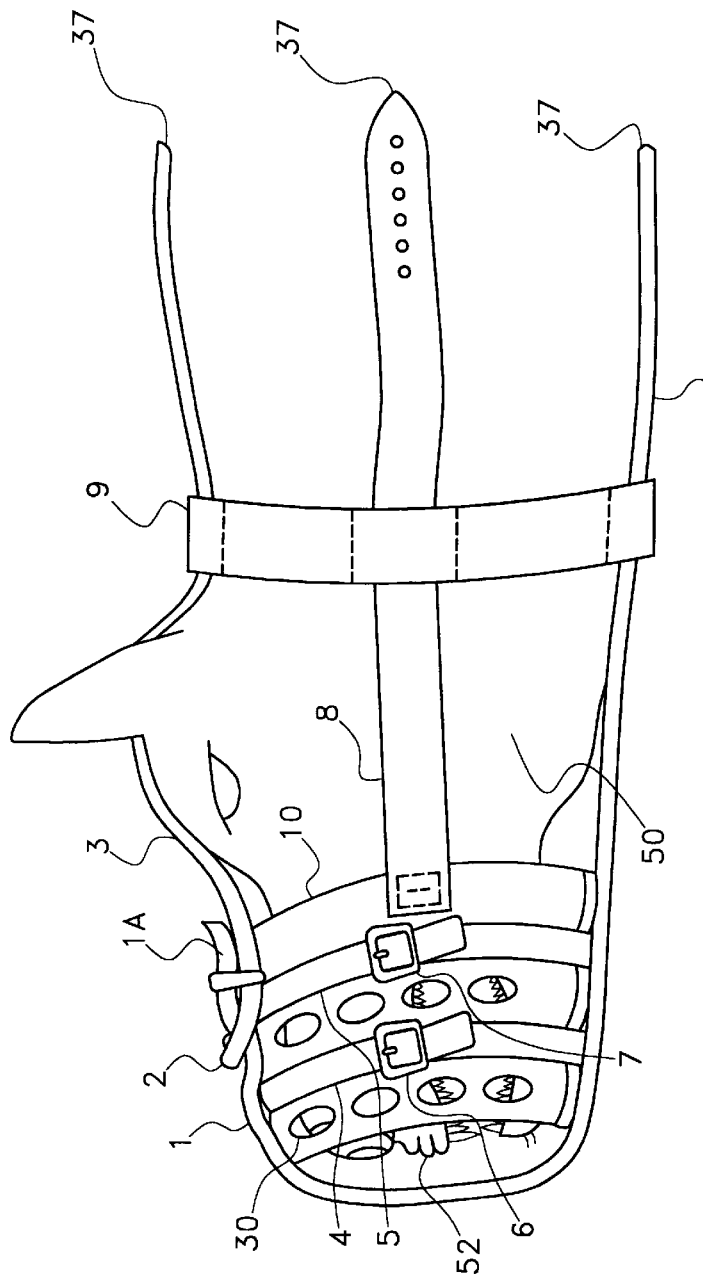
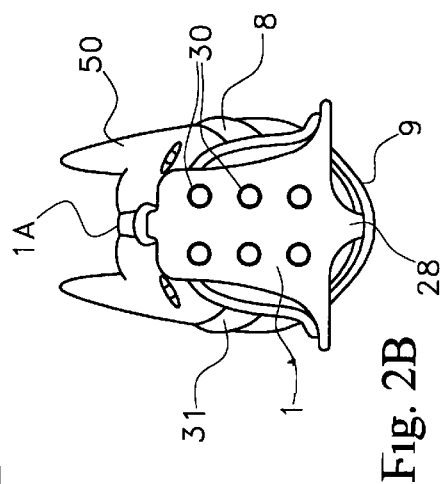
Fig. 2A
Fig. 2B

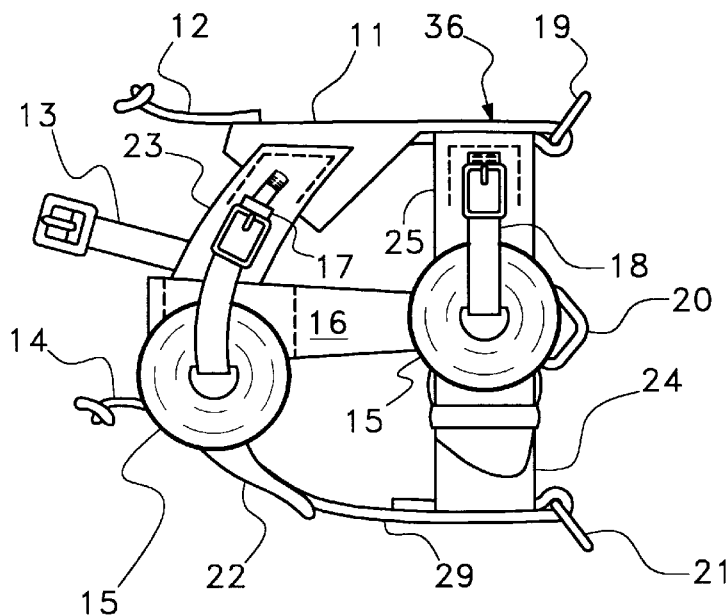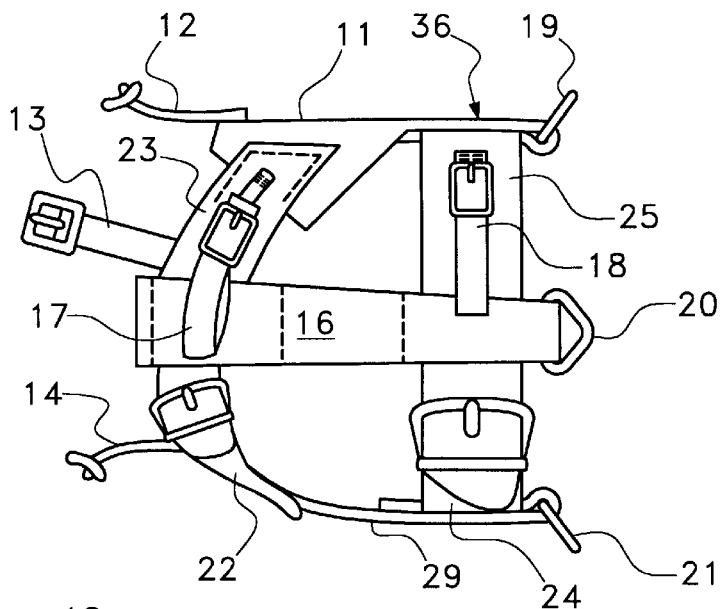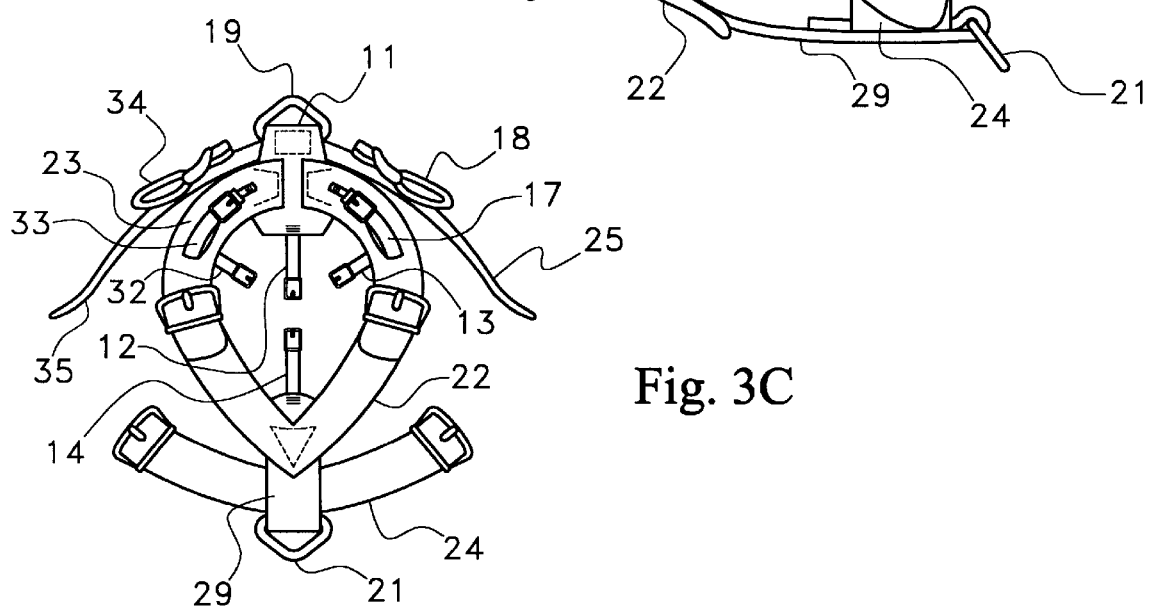

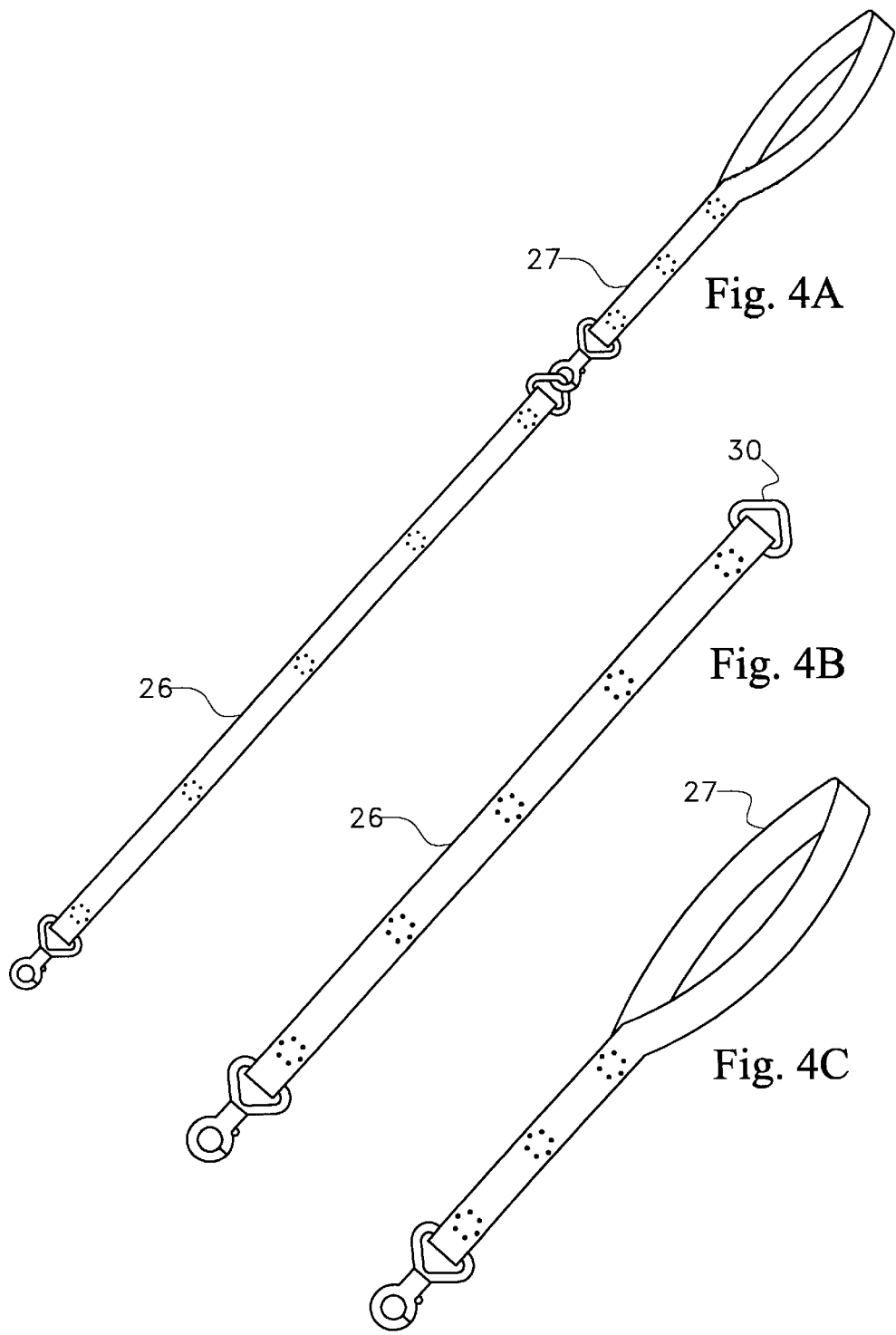

5,950,570

WEIGHT AND PULLING MUZZLED HARNESS

BACKGROUND OF THE INVENTION

This invention relates to a very versatile apparatus for training, restraining, and conditioning dogs for competition and protection work.

In training dogs for competition weight pulling contests, it is more practical for time and space conservation to run or walk a dog with weights on or dragging weight to build up strength and stamina than for the dog to walk or run without resistance.

In training dogs for protection they must be agitated in a very careful manner. In many instances the dog may need to be restrained but not discouraged to lunge at a decoy. A dog that lunges while being restrained by a collar will often get discouraged, but if the dog is restrained by my harness the resistance is distributed over its body and is much less discouraging.

Often in this type of agitation the dog should not be allowed to bite the decoy, and an effective muzzle needs to stay on even in high levels of agitation.

In distance agitation, when sending a dog out on a decoy a very short and a long lead are both used, sometimes at the same time, and need to be attached and detached very quickly.

BRIEF SUMMARY OF THE INVENTION

It is an object of this invention to provide a complete and reliable restraining device for conditioning dogs in a wide variety of training situations and the ability to allow the dog relief in other situations.

It is an object of this invention to distribute weight from weights or the dog's own resistance evenly across its own body.

It is an object of this invention that a muzzled part will not come off during agitation because it fastens onto a harnessing part.

It is an object of this invention to allow a dog to pull weight from the top, bottom, or sides.

It is an object of this invention to allow a handler to change lead lengths quickly, easily or with one hand.

BRIEF DESCRIPTION OF THE SEVERAL VIEWS OF THE DRAWINGS

FIG. 2A is an enlarged fragmentary side elevational view showing a part of the apparatus, in place upon the dog;

FIG. 2B is a reduced front elevational view of the part of the apparatus illustrated in FIG. 2A, in place upon the dog;

FIG. 3A is a side elevational view showing another part of the apparatus, with supplemental weights attached;

FIG. 3B is a side elevational view similar to FIG. 3A, but with the supplemental weights removed;

FIG. 3C is a front alevational view of the part of the apparatus illustrated in FIG. 3B, with component parts in another position;

FIG. 4A is a side elevational view of a hand restraining apparatus used in connection with the invention;

FIG. 4B is a side elevational view of a part of the hand restraining apparatus of FIG. 4A; and FIG. 4C is a side elevational view of another part of the hand restraining apparatus of FIG. 4A.

DETAILED DESCRIPTION OF THE INVENTION

Figure 1:
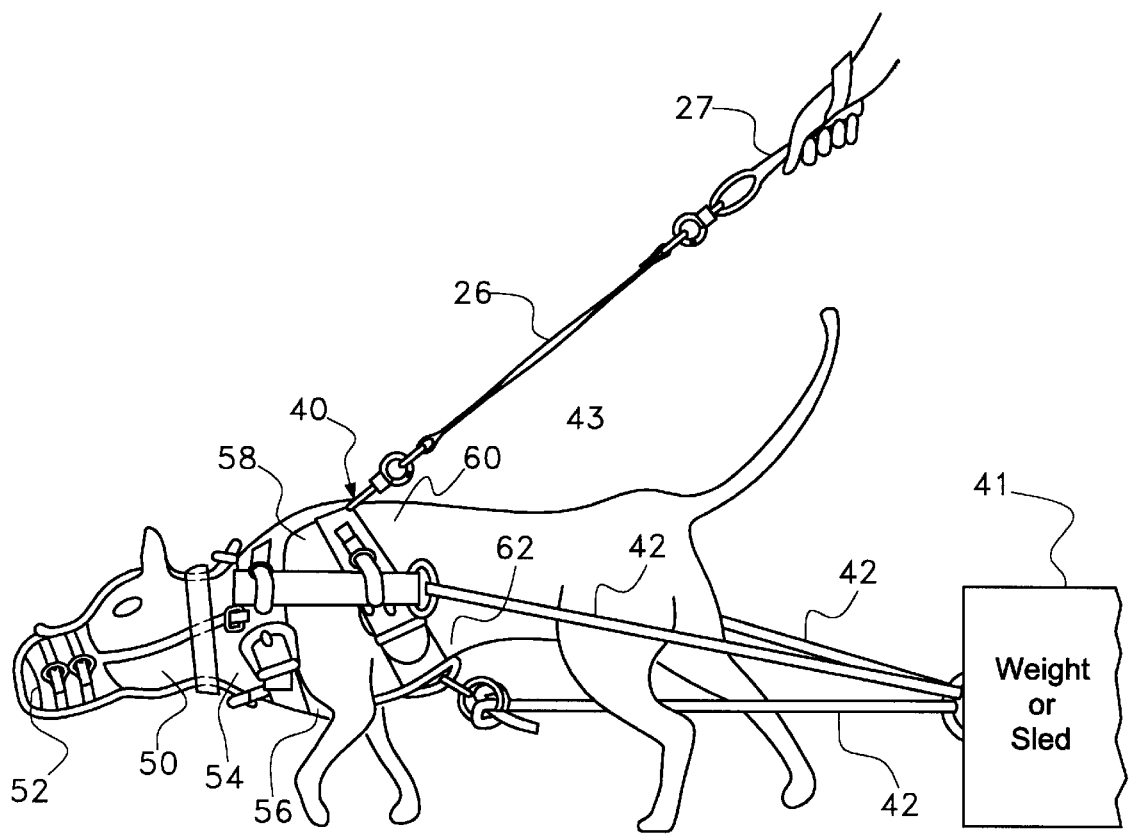
FIG. 1 is a largely pictorial, side elevational view showing an apparatus constructed in accordance with my invention, in use in connection with a dog.

FIG. 1 shows the entire apparatus 40 in use and how weight or a sled 41 is attached by means of pull straps 42 for pulling and how the apparatus 40 fits onto a the dog 43 and attaches to a hand held restraint, shown in the form of a lead assembly 26, 27. Dog 43 has a forward head 50, including a snout 52, a rearward neck 54 and a breast 56, shoulders 58, a back 60 and a belly 62 rearward of the neck 54.

FIG. 2 shows muzzling parts 1 and 10 which make up the muzzle body or muzzle snout and carry buckles 2, 6 and 7 to which adjustment straps 1A, 4 and 5 are fastened to adjust the fit of the muzzle snout. Muzzle fastener elements in the form of muzzle straps 8, 3, 28 and 31 include remote rearward ends 37 and go through collar 9 which is of two ply construction with spaces between the plies to allow passage of the muzzle straps 8, 3, 28 and 31. These straps 8, 3, 28 and 31 then fasten onto a harness illustrated in FIGS. 3A, 3D and 3C at 36, the harness 36 carrying strap-and-buckle assemblies 12, 13, 14, and 32.

FIG. 3A shows where supplemental weights 15 are strapped to harness 36 by supplemental weight securement elements in the form of straps 17, 18, 33 and 34 that buckle onto themselves when weights 15 are not present, as seen in FIGS. 3B and 3C.

The strap-and-buckle assembly 12 is sewn or riveted to harness spine piece 11 to provide the harness 36 with a front fastening point. A "D" shaped metal ring 19 is sewn or riveted between two plies of the harness spine piece 11. A "D" shaped metal ring 21 is sewn or riveted between two plies of a harness chest piece 29. A harness belly piece 24 also goes through the space between the plies and fastens to harness back piece 25 to establish a rearward harness assembly.

Harness shoulder piece 23 is fastened to the harness spine piece 11 and is buckled onto harness breast piece 22 to establish a forward harness assembly.

Side pull panels 16 are two ply with spaces for harness shoulder piece 23 and harness back piece 25 to go through and fasten to harness breast piece 22 and harness belly piece 24, respectively. The side pull panels 16 also have a "D" shaped ring 20 that i n secured between the plies. The "D" shaped metal rings 19, 20 and 21 provide rear fastening points for attaching the pull straps 42 to the harness 36.

Air holes 30 allow unrestricted breathing.

FIGS. 4A, 4B and 4C show the hand restraining apparatus in the form of a two ply lead extension 26 stitched where indicated between the plies of which a "D" shaped ring 30 is secured, and to which a two ply lead 27 of much shorter length is selectively attached or detached. This apparatus in whole or in part attaches to any selected one of the "D" shaped rings 19, 21 or 20.

This invention allows restraint of an animal without hindering its pedal or visual mobility, also restricting it from biting even in training situations when it is encouraged to bite.

Very tenacious dogs are known to slide conventional muzzling apparatus over their heads which is virtually impossible when securely fastened to a harness. This security is improved when a very snug fitting collar 9 holds the straps 8, 3, 28 and 31 that attach the muzzling parts 1, 10 to the harness 36 just below the animal's head.

The V-shaped configuration of breast piece 22 at the neck, and angle of the shoulder piece 23 along with the overall width of the shoulder piece 23, as well as the breast piece 22, which is usually over an inch and a quarter, distribute weight affording the animal increased performance.

The ability to pull from one or more of the bottom and top allow for many diverse training and conditioning applications.

The option to be weighted offers a very significant stamina and strength building capability for this harness.

The two ply double fastening two-part fastening lead assembly 26, 27 allows one handed disconnecting and reconnecting. It also allows two handlers to restrain the animal, and is versatile in many other training situations.

It is intended that this invention be made from a very strong, durable and flexible material like leather, canvas, nylon and the like, riveted or stitched at seams. Buckles or similar adjustable fastener devices for all of the various straps, and the metallic "D" shaped rings should be rust inhibitive. The material used should be at least as durable as a good quality leather weighing seven ounces per square foot, preferably much more, up to but not limited at fourteen ounces per square foot, and capable of supporting applied weight and stress.

I claim:

1. Apparatus for training, restraining and conditioning a dog for competition and protection work, the dog having a forward head including a snout, a rearward neck and a breast, shoulders, a back and a belly rearward of the neck, the apparatus comprising:
a muzzle having a muzzle body for placement over the snout of the dog, the muzzle including muzzle fastener elements extending rearwardly from the muzzle body; and
a harness for securement over the breast, shoulders, back and belly of the dog, the harness having forward fastener elements complementary to the muzzle fastener elements for engaging the muzzle fastener elements to secure the muzzle body in place over the snout of the dog, and rearward fastener elements for the selective attachment of a dragging weight to the harness.

2. The apparatus of claim 1 wherein the muzzle fastener elements include muzzle straps extending rearwardly from the muzzle body and having rearmost ends, and the forward fastener elements include strap-and-buckle assemblies for selective attachment of the muzzle straps to corresponding strap-and-buckle assemblies.

3. The apparatus of claim 2 wherein the muzzle includes a collar located between the muzzle body and the rearmost ends of the muzzle straps for extending around the neck of the dog, and the muzzle straps are spaced apart along the collar.

4. The apparatus of claim 3 including four muzzle straps and four corresponding strap-and-buckle assemblies.

5. The apparatus of claim 1 wherein the rearward fastener elements include "D" shaped rings affixed to the harness.

6. The apparatus of claim 1 wherein the harness includes weight securement elements for selectively securing supplemental weights to the harness.

7. The apparatus of claim 1 wherein the harness includes:
a shoulder piece for extending over the shoulders of the dog;
a breast piece for extending along the breast of the dog;
forward fasteners for fastening the breast piece to the shoulder piece to establish a forward harness assembly;
a back piece for extending over the back of the dog;
a belly piece for extending along the belly of the dog;
rearward fasteners for fastening the belly piece to the back piece to establish a rearward harness assembly; and
interconnecting pieces connecting the forward harness assembly with the rearward harness assembly;
the forward fastener elements being located on the forward harness assembly; and
the rearward fastener elements being located on the rearward harness assembly.

8. The apparatus of claim 7 wherein the rearward fastener elements include "D" shaped rings affixed to the rearward harness assembly.

9. The apparatus of claim 7 wherein the harness includes weight securement elements for selectively securing supplemental weights to the harness.

10. The apparatus of claim 9 wherein the weight securement elements include first weight securement elements located on the forward harness assembly and second weight securement elements located on the rearward harness assembly.

11. The apparatus of claim 1 including a two-part lead assembly having a lead and a lead extension for selecting one of two alternate lead lengths, the lead and the lead extension each including attachment elements for selective attachment to the rearward fastener elements of the harness.

12. Apparatus for training, restraining and conditioning a dog for competition and protection work, the dog having a forward head including a snout, a rearward neck and a breast, shoulders, a back and a belly rearward of the neck, the apparatus comprising:
a harness for securement over the breast, shoulders, back and belly of the dog, the harness having rearward fastener elements for the selective attachment of a dragging weight to the harness.

13. The apparatus of claim 12 wherein the rearward fastener elements include "D" shaped rings affixed to the harness.

14. The apparatus of claim 12 wherein the harness includes weight securement elements for selectively securing supplemental weights to the harness.

15. The apparatus of claim 12 wherein the harness includes:
a shoulder piece for extending over the shoulders of the dog;
a breast piece for extending along the breast of the dog;
forward fasteners for fastening the breast piece to the shoulder piece to establish a forward harness assembly;
a back piece for extending over the back of the dog;
a belly piece for extending along the belly of the dog;
rearward fasteners for fastening the belly piece to the back piece to establish a rearward harness assembly; and
interconnecting pieces connecting the forward harness assembly with the rearward harness assembly;
the rearward fastener elements being located on the rearward harness assembly.

16. The apparatus of claim 15 wherein the breast piece has a V-shaped configuration.

17. The apparatus of claim 15 wherein the rearward fastener elements include "D" shaped rings affixed to the rearward harness assembly.

18. The apparatus of claim 15 wherein the harness includes weight securement elements for selectively securing supplemental weights to the harness.

19. The apparatus of claim 18 wherein the weight securement elements include first weight securement elements located on the forward harness assembly and second weight securement elements located on the rearward harness assembly.

20. The apparatus of claim 12 including a two-part lead assembly having a lead and a lead extension for selecting one of two alternate lead lengths, the lead and the lead extension each including attachment elements for selective attachment to the rearward fastener elements of the harness.

* * * * *